United States Patent
He

(10) Patent No.: US 10,012,929 B2
(45) Date of Patent: Jul. 3, 2018

(54) IMAGING CARTRIDGE CHIP, IMAGING CARTRIDGE, AND METHOD FOR SWITCHING IMAGING CARTRIDGE CHIP SERIAL NUMBER

(71) Applicant: APEX MICROELECTRONICS CO., LTD., Zhuhai (CN)

(72) Inventor: Xuefeng He, Zhuhai (CN)

(73) Assignee: APEX MICROELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 15/408,498

(22) Filed: Jan. 18, 2017

(65) Prior Publication Data

US 2017/0123344 A1    May 4, 2017

Related U.S. Application Data

(63) Continuation of application No. PCT/CN2015/096077, filed on Dec. 1, 2015.

(30) Foreign Application Priority Data

Jun. 25, 2015 (CN) .......................... 2015 1 0362300

(51) Int. Cl.
*G03G 15/00* (2006.01)
*G03G 15/08* (2006.01)
(Continued)

(52) U.S. Cl.
CPC ..... *G03G 15/0863* (2013.01); *H04N 1/00339* (2013.01); *H04N 1/00342* (2013.01); *H04N 1/4426* (2013.01); *H04N 1/4433* (2013.01)

(58) Field of Classification Search
CPC .......... G03G 15/0863; G03G 21/1896; G03G 21/1647; G03G 15/0865; G03G 15/55
(Continued)

(56) References Cited

U.S. PATENT DOCUMENTS 5,252,967 A * 10/1993 Brennan, Jr. .......... G01D 4/004
                                                            340/10.51
2002/0063762 A1    5/2002 Jozef Haan et al.
(Continued)

FOREIGN PATENT DOCUMENTS

CN    1447335 A    10/2003
CN    1701306 A    11/2005
(Continued)

OTHER PUBLICATIONS

The World Intellectual Property Organization (WIPO) International Search Report for PCT/CN2015/096077 dated Apr. 5, 2016 p. 1-16.
(Continued)

*Primary Examiner* — Walter L Lindsay, Jr.
*Assistant Examiner* — Frederick Wenderoth
(74) *Attorney, Agent, or Firm* — Anova Law Group, PLLC

(57) ABSTRACT

An imaging cartridge chip includes a communication module for providing data communication between the imaging cartridge chip and an imaging device; a non-volatile data storage module for storing at least two different serial numbers; a volatile temporary data storage module connecting between the communication module and the non-volatile data storage module and including at least two temporary data storage units; and a control module. The control module is configured to load different serial numbers into corresponding temporary data storage units; to send a serial number in a selected temporary data storage unit to the imaging device; to determine whether the serial number sent to the imaging device passes a legitimacy verification of the imaging device; and when the serial number sent to the imaging device does not pass the legitimacy verification, to send a serial number in another temporary data storage unit to the imaging device.

15 Claims, 5 Drawing Sheets

(51) Int. Cl.
*H04N 1/00* (2006.01)
*H04N 1/44* (2006.01)

(58) Field of Classification Search
USPC .......................................................... 399/12
See application file for complete search history.

(56) References Cited

U.S. PATENT DOCUMENTS

| 2005/0254832 | A1* | 11/2005 | Kumai ................. G03G 15/556 |
| | | | 399/12 |
| 2009/0248765 | A1* | 10/2009 | Akidau ................. G06F 11/004 |
| 2012/0327451 | A1 | 12/2012 | Miller et al. |
| 2015/0032936 | A1 | 1/2015 | Yu |
| 2017/0131658 | A1* | 5/2017 | Lee ........................ G03G 15/55 |

FOREIGN PATENT DOCUMENTS

| CN | 101007467 A | 8/2007 |
| CN | 101692347 A | 4/2010 |
| CN | 101894285 A | 11/2010 |
| CN | 101913292 A | 12/2010 |
| CN | 103640339 A | 3/2014 |
| CN | 103879152 A | 6/2014 |
| CN | 104943397 A | 9/2015 |
| DE | 69824812 T2 | 11/2004 |
| EP | 1136267 A1 | 9/2001 |
| JP | 2005219361 A | 8/2005 |
| WO | 2015030818 A1 | 3/2015 |
| WO | 2015039432 A1 | 3/2015 |

OTHER PUBLICATIONS

China Intellectual Property Organization (SIPO) Search Report for 2015103623009 dated Mar. 11, 2016 2 Pages.

* cited by examiner

IMAGING CARTRIDGE CHIP, IMAGING CARTRIDGE, AND METHOD FOR SWITCHING IMAGING CARTRIDGE CHIP SERIAL NUMBER

CROSS-REFERENCES TO RELATED APPLICATIONS

This application claims priority of International Patent Application No. PCT/CN2015/096077, filed on Dec. 1, 2015, which claims priority of Chinese Application No. 201510362300.9, filed on Jun. 25, 2015, and the entire contents of all of above applications are hereby incorporated by reference.

FIELD OF THE INVENTION

The present disclosure generally relates to the field of printing technologies and, more particularly, relates to an imaging cartridge chip, imaging cartridge, and method for changing imaging cartridge chip serial number.

BACKGROUND

With the development of imaging techniques, various imaging devices, such as copiers, printers, fax machines, and word processors, have been widely used. The imaging devices are provided with imaging cartridges (e.g., ink cartridges, toner cartridges) containing recording material (e.g., ink, toner) and the imaging cartridges can be conveniently replaced by the users. An imaging cartridge is usually provided with an imaging cartridge chip.

The imaging cartridge chip stores original data associated with the imaging cartridge and usage data generated during imaging operation. The original data can include imaging cartridge manufacturer code, manufacturing date, cartridge type, and characteristic parameters, etc. The usage data can include imaged pages, remaining amount of the recording material, and number of turns made by rotary units. A rotary unit refers to a photosensitive drum, a charging roller, a developing roller, a feeding roller, or other internal components of the imaging device.

Further, some manufacturers of imaging devices try to monopolize the market and restrict the production of compatible chips or the reuse of recycled chips, and generally assign each imaging cartridge chip with its own "identity card number", i.e., a serial number. Even for imaging cartridge chips of the same type, the serial number stored in each imaging cartridge chip is not the same.

After the imaging device provides power to the imaging cartridge chip, the imaging device reads the stored serial number inside the chip to verify the legitimacy of the imaging cartridge. If the imaging device detects that the serial number sent by the imaging cartridge chip does not comply with a preset rule, the imaging device will stop imaging operation, and directly or indirectly prompt an error message.

In addition, the imaging device also stores serial numbers of used-up imaging cartridge chip, and compares the stored serial numbers with the serial number of the newly-replaced imaging cartridge chip. If the serial number of the newly-replaced imaging cartridge chip is same as a stored serial number, the imaging device considers the imaging cartridge chip illegitimate, and the imaging device will reject the imaging cartridge.

The legitimate serial numbers are kept in the bands of the imaging device manufacturers and usually are not available to others. Thus, for chip manufacturers, obtainable legitimate serial numbers are very limited, which obviously is not beneficial to healthy market competition. In addition, for certain imaging cartridge provided by the manufacturer of the imaging device, once the recording material in the imaging cartridge is depleted, even after the imaging cartridge is refilled with new recording material and the imaging cartridge chip is reset, the refilled imaging cartridge still cannot be used with the imaging device due to the serial number issue. In this case, the user can only purchase a new imaging cartridge to continue using the imaging device, resulting in a waste of resource and not being environmental friendly.

The disclosed toner cartridges and methods are directed to solve one or more problems set forth above and other problems.

BRIEF SUMMARY OF THE DISCLOSURE

One aspect of the present disclosure includes an imaging cartridge chip. The imaging cartridge chip includes a communication module for providing data communication between the imaging cartridge chip and an imaging device; a non-volatile data storage module for storing at least two different serial numbers; a volatile temporary data storage module; and a control module. The volatile temporary data storage module connects between the communication module and the non-volatile data storage module, and includes at least two temporary data storage units. The control module is configured to, based on a preset condition, load different serial numbers into corresponding temporary data storage units; when the imaging device requests to read serial number information from the imaging cartridge chip, to send a serial number a selected temporary data storage unit to the imaging device via the communication module; to determine whether the serial number sent to the imaging device passes a legitimacy verification of the imaging device; and when the serial number sent to the imaging device does not pass the legitimacy verification of the imaging device, to send a serial number in another temporary data storage unit to the imaging device.

Another aspect of the present disclosure includes an imaging cartridge. The imaging cartridge includes an imaging cartridge chip mounted on the imaging cartridge. The imaging cartridge chip includes a communication module for providing data communication between the imaging cartridge chip and an imaging device; a non-volatile data storage module for storing at least two different serial numbers; a volatile temporary data storage module; and a control module. The volatile temporary data storage module connects between the communication module and the non-volatile data storage module, and includes at least two temporary data storage units. The control module is configured to, based on a preset condition, load different serial numbers into corresponding temporary data storage units; when the imaging device requests to read serial number information from the imaging cartridge chip, to send a serial number in a selected temporary data storage unit to the imaging device via the communication module; to determine whether the serial number sent to the imaging device passes a legitimacy verification of the imaging device; and when the serial number sent to the imaging device does not pass the legitimacy verification of the imaging device, to send a serial number in another temporary data storage unit to the imaging device.

Another aspect of the present disclosure includes a serial number switching method of an imaging cartridge chip. The imaging cartridge chip has to non-volatile data storage module for storing at least two different serial numbers and a volatile temporary data storage module containing at least two temporary data storage units. The method includes (a) reading two different serial numbers from the data storage module and loading the two different serial numbers into a first temporary data storage unit and a second temporary data storage unit, respectively; (b) sending the serial number in the first temporary data storage unit to an imaging device; (c) determining whether the serial number sent to the imaging device passes a legitimacy verification of the imaging device; and (d) when the serial number sent to the imaging device does not pass the legitimacy verification of the imaging device, send the serial number in the second temporary data storage unit to the imaging device.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
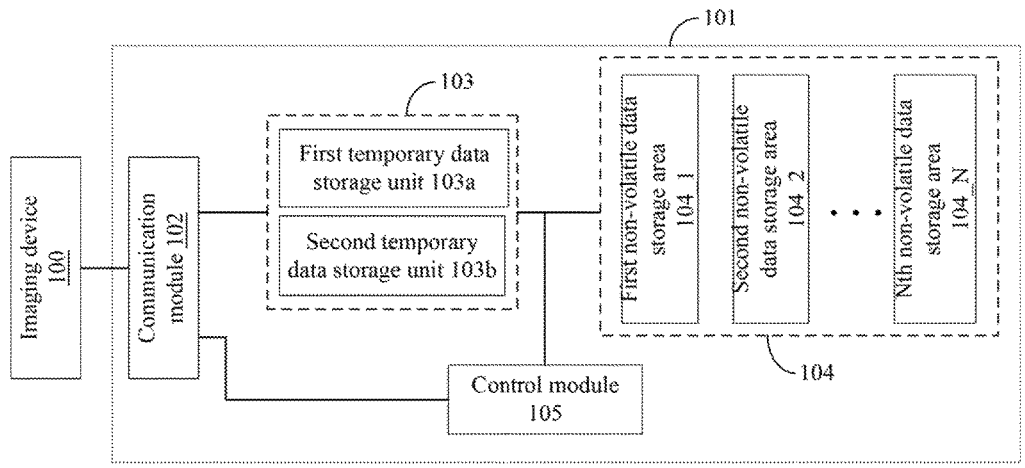
FIG. 1 illustrates an exemplary imaging cartridge chip according to disclosed embodiments.

Reference will now be made in detail to exemplary embodiments of the disclosure, which are illustrated in the accompanying drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined in different ways as long as such combination does not incur any conflict.

To solve the chip serial number problems, chip manufacturers try to store a plurality of serial numbers in a nonvolatile memory of an imaging cartridge chip. When the recording material in an imaging cartridge is depleted or when the imaging device considers that the current serial number of the imaging cartridge chip is not legitimate, the imaging cartridge chip will run a switching operation on the serial number, so that a new serial number is loaded from the nonvolatile memory to the SRAM (static random access memory), and the imaging cartridge chip sends the serial number in the SRAM to the imaging device when communicating with the imaging device.

Such switching operation of chip serial number is mostly done in two ways. One way is to include the SRAM and a nonvolatile memory in the imaging cartridge chip, when condition for switching the serial number is satisfied, an external MCU is used to replace the current serial number data with new serial number data, and the new serial number is loaded into the SRAM. The serial number in the SRAM is then sent to the imaging device when the imaging cartridge chip is communicating with the imaging device. These steps are repeated until the imaging device recognize the imaging cartridge, e.g., a new serial number of the imaging cartridge chip being a legitimate serial number recognized by the imaging device.

The other way is to include the SRAM and a plurality of non-volatile memory regions (denoted as EE_A, EE_B, . . . ). When the imaging cartridge chip is powered up, the serial number information stored in EE_A is loaded into the SRAM. When the condition for switching the serial number is still satisfied, the serial number information stored in EE_B is then load into the SRAM, and so on, until the imaging device recognize the imaging cartridge, e.g., a stored serial number of the imaging cartridge chip being a legitimate serial number recognized by the imaging device.

Thus, a disadvantage of these switching methods is that, when the current serial number does not meet the communication requirement (i.e., when the serial number is required to be replaced), the serial number or data cannot be switched in real-time, but requires a certain response time. For example, the replacing serial number in the non-volatile memory as in the first way and loading the serial number stored in the EE_B to the SRAM as in the second way all require a certain response time and, thus, limited by instruction timing of the imaging device. Thus, these operations usually can only be performed when the imaging device is powered-up or between instructions of the imaging device. When the bus timing of the imaging device is more stringent or when the serial number or data needs to be switched during communication, both ways may be difficult to implement.

The present disclosure provides an improved way to switch the serial number in the imaging cartridge chip without the restriction of the bus timing of the imaging device. FIG. 1 shows an exemplary imaging cartridge chip consistent with the disclosed embodiments.

As shown in FIG. 1, an imaging cartridge chip 101 includes a communication module 102, a volatile temporary data storage module 103, a non-volatile data storage module 104, and a control module 105. Certain module(s) may be omitted and other modules may be added.

The imaging cartridge chip 101 may be a general purpose processor, an application specific IC (ASIC), or any appropriate integrated circuit. The imaging cartridge chip 101 may also include various peripheral circuits and components to implement various modules.

The communication module 102 is provided for implementing data communication between imaging device 100 and the imaging cartridge chip 101, such as receiving data from the imaging device 100, and transmitting data to the imaging device 100. In one embodiment, a contact connection may be achieved between the communication module 102 and the imaging device 100. That is, the imaging cartridge chip 101 electrically connected to the imaging device 100 through metal contact, e.g., contact points on the imaging cartridge chip 101 touches contact points on the imaging device 100, to achieve bidirectional communication between the imaging device 100 and the imaging cartridge chip 101. In various embodiments, the imaging device may be a printer, a copier, or a fax machine, etc., and the imaging cartridge may be an ink cartridge or a toner cartridge, etc.

Other connection means may also be used to connect the communication module 102 and the imaging device 100. For example, the communication module 102 and the imaging device 100 may be connected through a non-contact connection means, such as a wireless connection, in which the imaging cartridge chip 101 may establish bidirectional communication with the imaging device 100 using a coil (or antenna) coupled to a coil (or antenna) on the imaging device 100.

Data storage module 104 may be provided for storing label information and a plurality of different serial numbers. Of course, the data storage module 104 may also store any other appropriate data. For example, in certain embodiments, the data storage module 104 may also store variable information and other non-variable information during the imaging operation of the imaging device 100. The variable information may include information on the remaining amount of the recording material, recording material consumption, and/or total number of printed pages, etc. The non-variable information may include color of the recording material, capacity of the recording material, manufacturing date, and/or the manufacturer code, etc.

It should be noted that those skilled in the art will appreciate that the data stored in the data storage module 104 can be either separately stored in different areas of the same memory or separately stored in multiple memories. At the same time, the data storage module 104 may be implemented by a single memory device, or a plurality of memory devices.

As shown in FIG. 1, the data storage module 104 may include N (N is an integer greater than or equal to 2) number of non-volatile data storage areas (i.e., a first non-volatile data storage area 104_1, a second non-volatile data storage area 104_2, . . . , to an Nth non-volatile data storage area 104_N), and each non-volatile data storage area has a serial number. Thus, the data storage module 104 stores a plurality of different serial numbers through different non-volatile data storage areas.

Figure 2:
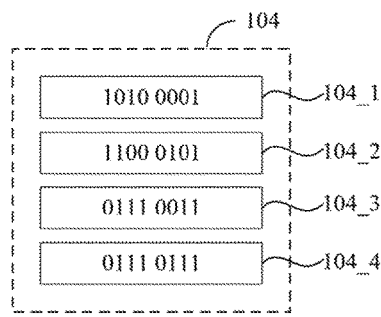
FIG. 2 illustrates an exemplary data storage module according to disclosed embodiments.

Specifically, as shown in FIG. 2, the data storage module 104 may include four non-volatile data storage areas, i.e., the first non-volatile data storage area 104_1, the second non-volatile data storage area 104_2, the third non-volatile data storage area 104_3, and the fourth non-volatile data storage area 104_4. Further, the serial number stored in the first non-volatile data storage area 104_1 is 10100001, the serial number stored in the second non-volatile data storage area 104_2 is 11,000,101, the serial number stored in the third non-volatile data storage area 104_3 is 01110011, and the serial number stored in the fourth non-volatile data storage area 104_4 is 01,110,111. Other serial numbers and/or other numbers of non-volatile data storage areas may also be included.

In one embodiment, the data storage module 104 may be implemented by EEPROM (electrically erasable programmable read-only memory). Of course, in other embodiments, the data storage module 104 may also be implemented by other appropriate components or circuits. For example, the data storage module 104 can be implemented by using EPROM (erasable programmable read-only memory), FLASH, a ferroelectric memory, or a phase change memory non-volatile memory device implemented, etc. The data storage module 104 can also be implemented by using a circuit consists of an SRAM and a long-life battery or a circuit consists of an SRAM and a capacitor.

Still referring to FIG. 1, the temporary data storage module 103 may be connected between the data storage module 104 and the communications module 102, and may include at least two temporary data storage units. The temporary data storage module 103 may be implemented by using a volatile memory. In one embodiment, the temporary data storage module 103 may include a first temporary data storage unit 103a and a second temporary data storage unit 103b. Both the first temporary data storage unit 103a and the second temporary data storage unit 103b may be connected with the data storage module 104 and the communications module 102.

In certain embodiments, the temporary data storage module 103 may be implemented using SRAM, and the first temporary data storage unit 103a and the second temporary data storage unit 103b may be represented by SRAM_A and SRAM_B, respectively. In certain other embodiments, the temporary data storage module 103 may also be implemented using other appropriate components or circuits. For example, the temporary data storage module 103 may be implemented using one or more of register and RAM (random access memory). Similarly, the temporary data storage units in the temporary data storage module 103 may be implemented using different volatile memories, or using different storage areas in a same volatile memory.

The control module 105 can be provided for loading serial number information stored in the data storage module 104 into the corresponding temporary data storage unit in the temporary data storage module 103. Further, the control module 105 may send the serial number information stored in the specified data temporary storage unit (e.g., SRAM_A) to the imaging device 100. The control module 105 may be a central processing unit (CPU), a controller, or any appropriate processor circuitry.

The control module 105 may be triggered to load the serial number information into the temporary data storage module 103 by one or more of preset conditions, such as the imaging cartridge chip being powered-on and initialized by an imaging device, detecting that the imaging device stopped powering the imaging cartridge chip, receiving a reset signal from the imaging device, receiving read/write instructions retransmitted by the imaging device, detecting that the clock signal transmitted by the imaging device runs slower or faster, and detecting that the imaging device continues to power the imaging cartridge chip but the signals on the data bus or on clock line remain unchanged, etc. Instructions associated with the initialization may include instructions clearing the registers of the imaging cartridge chip and instructions for reading out all data stored in the imaging cartridge chip. Other conditions may also be included.

The imaging device 100 may verify the legitimacy of the received serial number information, so as to determine whether the received serial number is legitimate and to further determine whether the installed imaging cartridge is legitimate. If the serial number information passes the legitimacy verification of the imaging device 100, the imaging device 100 continues with subsequent imaging operation. If the serial number information does not pass the legitimacy verification of the imaging device 100, the imaging device 100 refuses to use the imaging cartridge.

In one embodiment, based on the content of the received command or instruction, the control module 105 may determine whether the serial number sent to the imaging device 100 passes the legitimacy verification of the imaging device 100.

When the imaging device determines that the serial number information received from the imaging cartridge chip is legitimate, the imaging device often needs to write some information to imaging cartridge chip. Such information may include the chip's first installation date, confirmed remaining amount of the recording material, recording material consumption, and current temperature and/or humidity of the imaging device, etc. Therefore, after the imaging cartridge chip sends the serial number information to the imaging device, if the imaging device does not transmit to the imaging cartridge chip with instructions to write into the imaging cartridge chip, the control module of the imaging cartridge chip may determine that the serial number currently sent to the imaging device is not accepted by the imaging device, i.e., the serial number currently sent to the imaging device does not pass the legitimacy verification of the imaging device. That is, the serial number information is not legitimate, or the chip does not recognize the imaging device.

In addition, certain imaging devices may also write some information into the imaging cartridge chip even after determining that the received serial number information is not legitimate. However, such information may be different from the information written to the imaging cartridge chip after determining that the received serial number information is legitimate.

For example, when the imaging device determines that the received serial number information is illegitimate, the imaging device may write to the imaging cartridge chip with mark or label information, such as the chip's first installation date or the chip's unavailability. When in the imaging device determines that the received serial number information is legitimate, the imaging device may write to the imaging cartridge chip with operation parameter information such as latest detected or calculated remaining amount of the recording material or recording material consumption. Thus, by analyzing the type and/or content of the received instructions, the control module 105 may determine whether the selected serial number (i.e., the serial number information just sent to the imaging device) is a legitimate serial number.

It should be noted that, in other embodiments, the control module 105 may also determine whether the serial number information currently sent to the imaging device passes the legitimacy verification of the imaging device 100 based on other appropriate methods. For example, the control module 105 may determine whether the serial number information currently sent to the imaging device passes legitimacy verification of the imaging device 100 based on the number of received instructions with matching ID information in a preset time period.

For an imaging device, to achieve color imaging, it often requires a plurality of imaging cartridges, and these imaging cartridges are all installed with chips. To reduce communication lines, the imaging cartridge chips on the plurality of imaging cartridges are often connected to the imaging device via the same signal bus. To distinguish from each other, generally each imaging cartridge chip is configured with a device address, which may be configured based on the color/type of the recording material in each imaging cartridge. The device address may be stored in the data storage module, and may also be referred as the identification information or ID.

Instructions sent to the imaging cartridge chip from the imaging device normally include the ID information. When the imaging cartridge chip receives an instruction, the imaging cartridge chip may compare the received ID information with its stored ID information to determine whether the instruction is sent to itself.

Further, certain imaging device may, after determining that the serial number information from the imaging cartridge chip is legitimate, further verify the logic functionality of the imaging cartridge chip. For example, the imaging device first sends a random number to the imaging cartridge chip, the imaging cartridge chip processes the random number based on a preconfigured arithmetic logic, the imaging cartridge chip then sends the processed number back to the imaging device, and the imaging device verifies the logic function of the imaging cartridge chip based on received processed number.

During this logic function verification process, the imaging device may send multiple instructions to the imaging cartridge chip. Thus, based on whether the number of received instructions with matching ID information within a preset time period (e.g., within 2 seconds after power-on initialization) reaches a preset value (e.g., 3), the control module may determine whether the selected serial number is a legitimate serial number. If the number of received instructions reaches the preset value, the control module may determine that the selected serial number is a legitimate serial number.

In another embodiment, the control module may also determine whether the serial number sent to the imaging device passes the legitimacy verification of the imaging device based on whether the imaging cartridge chip receives new instructions from the imaging device within a preset time period.

Certain imaging device may stop sending any new instruction to the imaging cartridge chip after determining that the received serial number information is illegitimate, but may continue sending new instructions to a legitimate imaging cartridge chip. Thus, the control module can start timing after the serial number is sent to the imaging device, and determines whether any new instruction is received within a predetermined time period (e.g., 2 seconds). For instruction with ID information, the control module also determines whether the ID information in the instruction matches the stored ID information in order to confirm that the instruction is addressed to the imaging cartridge chip. If a new instruction is received, the control module can determine that the serial number information just sent has been accepted by the imaging device, and the serial number is legitimate. In such case, it can be said that the chip recognizes the imaging device.

If the control module 105 determines that the serial number information send to the imaging device 100 does not pass the legitimacy verification of the imaging device 100 (i.e., the serial number information is illegitimate), the control module 105 may send the serial number information in another temporary data storage unit (for example, SRAM_B) to the communication module. In general, after the switching of the chip's serial number, the switched serial number can recognize the imaging device, i.e., the imaging device accepts the switched serial number as legitimate.

Because the temporary data storage module as data registers (i.e., the volatile memory) have a faster read and write speed than the non-volatile memory, and two volatile data storage units are provided to load different serial numbers, when the serial number needs to be switched, the two volatile data storage units can be switched to achieve switching the two serial numbers. Thus, the switching is not affected by the bus timing of the imaging device.

Figure 3:
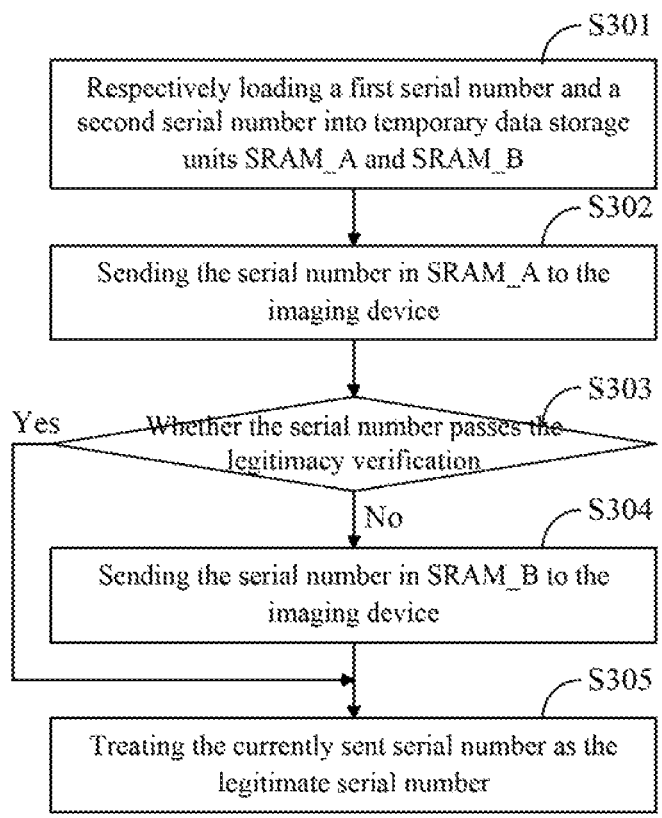
FIG. 3 illustrates a flow chart of an exemplary imaging cartridge chip serial number switching process according, to disclosed embodiments.

FIG. 3 shows a flow chart of an exemplary serial number switching process consistent with the disclosed embodiments. As shown in FIG. 3, the switching process may include the following steps.

Step S301: respectively loading a first serial number and a second serial number into the temporary data storage units SRAM_A and SRAM_B.

Specifically, when a preset condition is satisfied, such as the imaging cartridge chip is initially powered-up, the first serial number and the second serial number are read from the data storage module in step S301, and respectively loaded to the first temporary data storage unit SRAM_A and the second temporary data storage unit SRAM_B.

Step S302: sending the serial number in SRAM_A to the imaging device.

Specifically, when the imaging device requests to read the serial number information from the imaging cartridge chip, the control module starts the first temporary data storage unit SRAM_A and, via the communication module, sends the serial number stored in the first temporary data storage unit SRAM_A (i.e., the first serial number) to the imaging device.

Step S303: determining whether the serial number passes the legitimacy verification of the imaging device.

Specifically, the control module may determine whether the serial number information sent to the imaging device (i.e., the first serial number) passes the legitimacy verification of the imaging device. Details on how to make the determination are describe above and not repeated herein.

Step S304: if said serial number does not pass the legitimacy verification of the imaging device, sending the serial number in SRAM_B to the imaging device.

Specifically, if the first serial number does not pass the legitimacy verification of the imaging device, the serial number stored in the second temporary data storage unit SRAM_B (i.e., the second serial number) is sent to the imaging device.

Step S305: treating the currently sent serial number as the legitimate serial number.

Specifically, if the serial number passes the legitimacy verification of the imaging device, the currently sent serial number (i.e., the first serial number) is labeled as the legitimate serial number. If the first serial number does not pass the legitimacy verification, the second serial number is sent to the imaging device, and in general the switched serial number can pass the legitimacy verification of the imaging device. Thus, the currently sent serial number (i.e., the second serial number) is labeled as the legitimate serial number.

Figure 4:
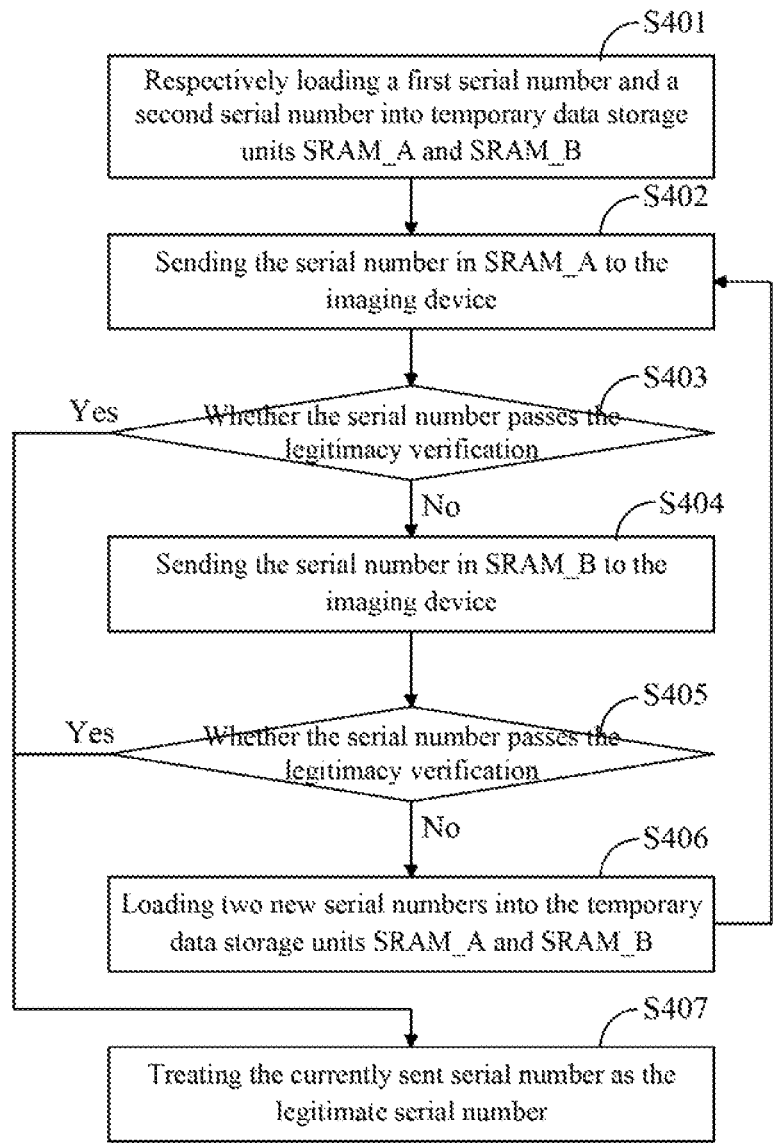
FIG. 4 illustrates a flow chart of another exemplary imaging cartridge chip serial number switching process according to disclosed embodiments.

Under certain circumstances, it may be possible that the second serial number is still illegitimate. FIG. 4 shows a flow chart of another exemplary serial number switching process consistent with the disclosed embodiments. As shown in FIG. 4, the switching process may include the following steps.

Steps S401, S402, S403, and S404 are same as Steps S301, S302, S303, and S304.

Step S405: determining whether the serial number passes the legitimacy verification of the imaging device.

Specifically, after the serial number in the second temporary data storage unit SRAM_B (i.e., the second serial number) is sent to the imaging device, the control module may again determine whether the serial number information sent to the imaging device (i.e., the second serial number) passes the legitimacy verification of the imaging device.

Step S406: respectively loading two new serial numbers into the temporary data storage units SRAM_A and SRAM_B.

Specifically, if the second serial number does not pass the legitimacy verification of the imaging device, two new serial numbers are read (e.g., from the data storage module), a third serial number and a fourth serial number, and the new serial numbers are loaded into the first temporary storage unit SRAM_A and the second temporary data storage unit SRAM_B. The switching process then continues at Step S402, until a legitimate serial number is found.

Step S407: treating the currently sent serial number as the legitimate serial number.

Specifically, if the second serial number passes the legitimacy verification of the imaging device, the currently sent serial number (i.e., the second serial number) is labeled as the legitimate serial number.

Thus, although the data storage module stores a plurality of serial numbers, only one serial number is selected as the chip's current serial number, i.e., a legitimate serial number. Once the legitimate serial number is selected, during any subsequent imaging operations, the imaging cartridge chip may use the legitimate serial number to communicate with the imaging device, until the imaging cartridge chip performs another serial number switching operation.

Further, label information may be used to record whether the currently selected serial number of the imaging cartridge chip is legitimate. If the label information is set to its initial value, it indicates that the currently selected serial number is considered legitimate by the imaging device and is a usable serial number. If the label information is not set to its initial value, it indicates that the currently selected serial number is considered illegitimate by the imaging device and is not a usable serial number, and such serial number information will not be accepted by the imaging device.

The serial number information generally may be obtained by reading data stored in the original imaging cartridge chip, or by analyzing rules used by the imaging device to generate the serial numbers. Based on these rules, the imaging cartridge chip may automatically generate the serial numbers, or the manufacturing equipment may generate the serial numbers and store the serial numbers into the imaging cartridge chip.

Because the temporary data storage module as data registers (i.e., the volatile memory) have a faster read and write speed than the non-volatile memory, and two volatile data storage units are provided to load different serial numbers, when the serial number needs to be switched, the two volatile data storage units can be switched to achieve switching the two serial numbers. Thus, the switching is not affected by the bus timing of the imaging device.

Figure 5:
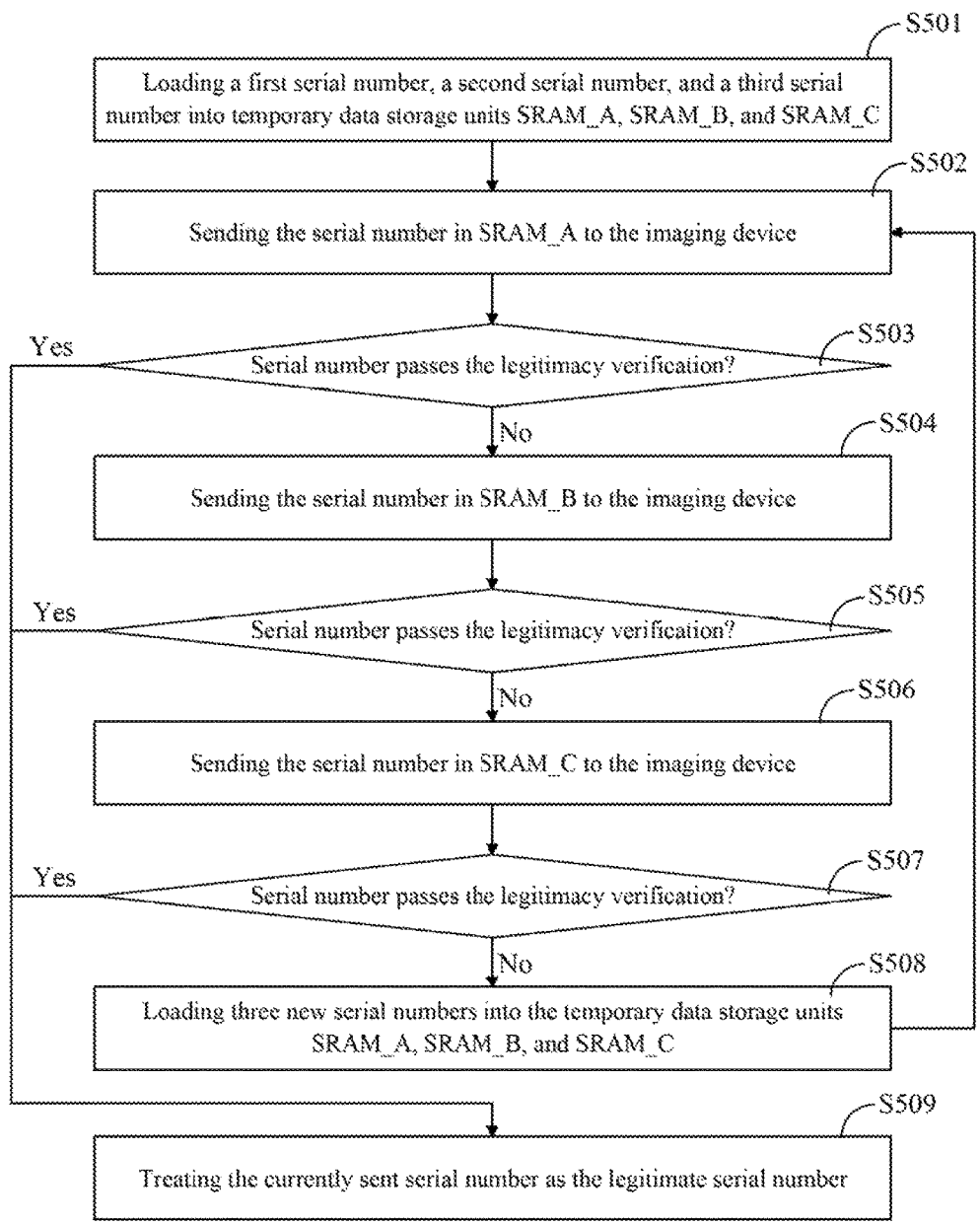
FIG. 5 illustrates a flow chart of another exemplary imaging cartridge chip serial number switching process according to disclosed embodiments.

In certain other embodiments, the number of temporary data storage units in the volatile temporary data storage module may be 3 or more than 3. FIG. 5 shows a flow chart of another exemplary serial number switching process when the volatile temporary data storage module includes 3 temporary data storage units, SRAM_A, SRAM_B and SRAM_C.

As shown in FIG. 5, the switching process may include the following steps.

Step S501: respectively loading a first serial number, a second serial number, and a third serial number into temporary data storage units SRAM_A, SRAM_B, and SRAM_C.

Step S502: sending the first serial number in SRAM_A to the imaging device.

Step S503: determining whether the first serial number passes the legitimacy verification of the imaging device.

Step S504: if it is determined that the first serial number does not pass the legitimacy verification of the imaging device, sending the second serial number in SRAM_B to the imaging device.

Step S505: determining whether the second serial number passes the legitimacy verification of the imaging device.

Step S506: if it is determined that the second serial number does not pass the legitimacy verification of the imaging device, sending the third serial number in SRAM_C to the imaging device.

Step S507: determining whether the third serial number passes the legitimacy verification of the imaging device.

Step S508: if it is determined that the third serial number does not pass the legitimacy verification of the imaging device, respectively loading three new serial numbers into the temporary data storage units SRAM_A, SRAM_B, and SRAM_C, and the switching process continues to Step S502.

Step S509: if it is determined that any of the first serial number, the second serial number, and the third serial number passes the legitimacy verification of the imaging device, treating the currently sent serial number as the legitimate serial number, and recording corresponding label information.

Figure 6:
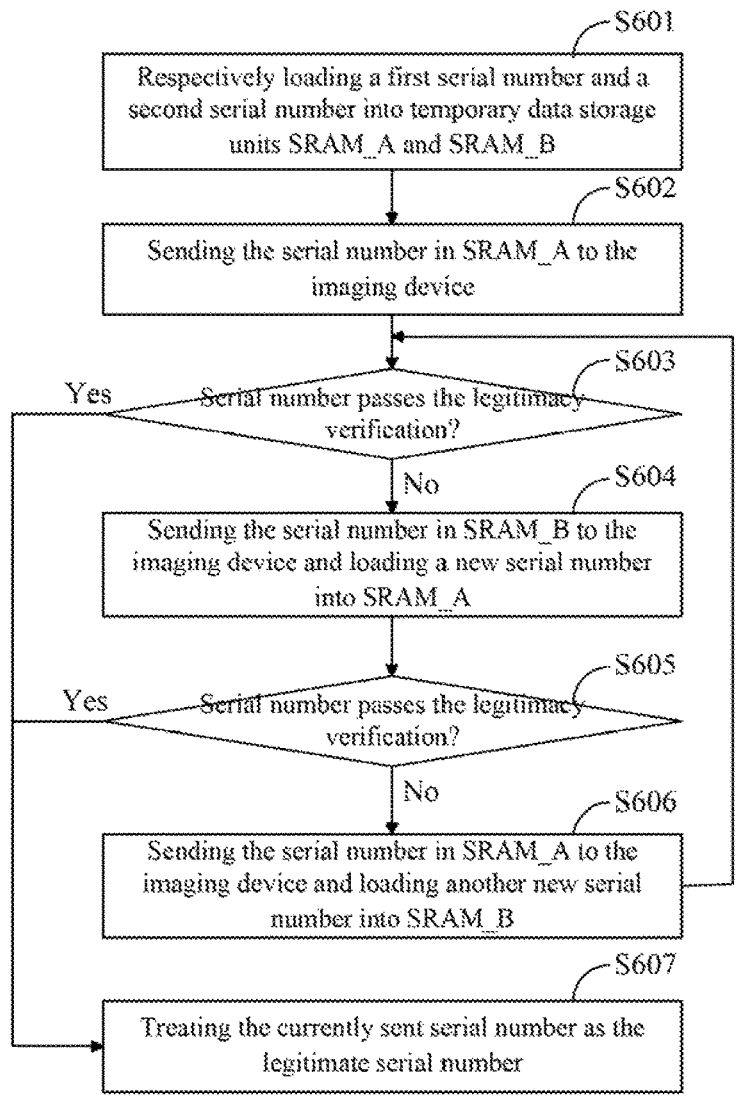
FIG. 6 illustrates a flow chart of another exemplary imaging cartridge chip serial number switching process according to disclosed embodiments.

FIG. 6 shows a flow chart of another exemplary serial number switching process for further speeding up the switching process. As shown in FIG. 6, the switching process may include the following steps.

Step S601: respectively loading a first serial number and a second serial number into temporary data storage units SRAM_A and SRAM_B.

Specifically, when the imaging cartridge chip is initially powered-up, the control module may, based on a preset rule, load the two different serial numbers from the data storage module into the first temporary data storage unit SRAM_A and the second temporary data storage unit SRAM_B. The preset rule may indicate a sequence based on which the different serial numbers in the nonvolatile data storage areas are loaded into the temporary data storage units, i.e., a mapping relationship between the nonvolatile data storage areas and the volatile temporary data storage units. For example, the control module may load the first serial number in the first nonvolatile data storage area into the first temporary data storage unit SRAM_A, and load the second serial number in the second nonvolatile data storage area into the second temporary data storage unit SRAM_B, and so on.

Step S602: sending the serial number in SRAM_A to the imaging device.

Specifically, when the imaging device requests to read the serial number information from the imaging cartridge chip, the control module starts with the first temporary data storage unit SRAM_A and, via the communication module, sends the serial number stored in the first temporary data storage unit SRAM_A (i.e., the first serial number) to the imaging device.

Step S603: determining whether the serial number in SRAM_A passes the legitimacy verification of the imaging device. The control module may determine whether the serial number in SRAM_A sent to the imaging device (i.e., the first serial number) passes the legitimacy verification of the imaging device.

If the control module determines that the serial number in SRAM_A is legitimate, Step S607 is performed. If the control module determines that the serial number in SRAM_A is not legitimate, Step S604 is performed.

Step S604: sending the serial number in SRAM_B (i.e., the second serial number) to the imaging device and, at the same time, loading a new serial number into SRAM_A (i.e., a third serial number).

Step S605: determining whether the second serial number passes the legitimacy verification of the imaging device. The control module may determine whether the serial number information sent to the imaging device (i.e., the second serial number) passes the legitimacy verification of the imaging device.

If the control module determines that the second serial number is legitimate, Step S607 is performed. If the control module determines that the second serial number is not legitimate, Step S606 is performed.

Step S606: sending the serial number in SRAM_A to the imaging device and, at the same time, loading another new serial number into SRAM_B. The control module sends the serial number in the first temporary data storage unit SRAM_A (i.e., the third serial number) to the imaging device and, at the same time, also loads a new serial number into the second temporary data storage unit (i.e., a fourth serial number). The switching process then continues from Step S603 to determine whether the serial number in SRAM_A passes the legitimacy verification of the imaging device.

That is, the third serial number and the fourth serial number are now becoming the first serial number and the second serial number, and this process can be repeated until a usable serial number is selected. After the first serial number, every time when the control module sends a serial number stored in a temporary data storage unit to the imaging device, the control module loads a new serial number into another temporary data storage unit. Thus, whenever the current serial number does not pass the legitimacy verification of the imaging device, the serial number in another temporary data storage unit can be sent to the imaging device immediately, until the chip recognizes the imaging device.

Step S607: treating the currently sent serial number as the legitimate serial number, e.g., the serial number in the first temporary storage unit SRAM_A or the serial number in the second temporary data storage unit SRAM_B.

It should be noted that, the imaging cartridge chip being initially powered-up may refer to any of the followings: a new imaging cartridge chip that has never been installed in an imaging device is installed in the imaging device for the first time, and the imaging device powers up the imaging cartridge chip; a used imaging cartridge chip is reset and is powered up for the first time after the reset; and the current serial number used by the imaging cartridge chip in the imaging device is no longer satisfying the communication requirement and needs a new serial number, etc.

In some embodiments, in general, the imaging cartridge chip sends its serial number to the aging device after receiving an instruction from the imaging device to read its serial number. In certain other embodiments, the imaging cartridge chip can also automatically send its serial number information to the imaging device after receiving an instruction from the imaging device to read all data in the data storage module, or within a preset time interval after power-on initialization. A particular type of imaging device may have a different characteristic or requirement.

Figure 7:
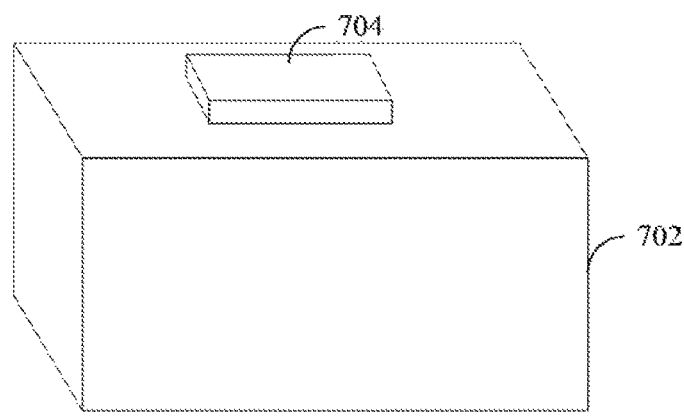
FIG. 7 illustrates an exemplary imaging cartridge according to disclosed embodiments.

Further, the present disclosure also provides an imaging cartridge. FIG. 7 shows an exemplary imaging cartridge.

As show in FIG. 7, an imaging cartridge 702 is provided, and an imaging cartridge chip 704 is mounted on the imaging cartridge 702. The imaging cartridge 702 may include appropriate imaging cartridge, such as an ink cartridge or a toner cartridge. The imaging cartridge chip 704 may include any appropriate ICs, circuit board, and other components to implement the chip and its various modules, as described above.

Therefore, by using the disclosed devices and methods, the imaging cartridge chip may be provided with at least two volatile storage areas. Using a mapping relationship between non-volatile memory areas and volatile memory areas, two different serial numbers are sent to different volatile storage areas when the chip is powered-up.

When the chip is considered as illegitimate by the imaging device, the chip's serial number can be switched by switching the volatile memory areas. Because the data registers (i.e., the volatile memory areas) have a faster read and write speed than the non-volatile memory, the chip does not need to spend extra time to load data from the nonvolatile memory to the volatile memory area. Instead, the chip can load the currently selected serial number in a one-step operation and, thus, the switching is not affected by the bus timing of the imaging device.

It should be noted that the above embodiments are merely provided for describing the technical solutions of the present invention, and not intended to limit the scope thereof. Although detailed descriptions are provided regarding the various embodiments, those skilled in the art can appreciate that the disclosed technical solutions can be modified, or some or all of the technical features can be equivalently replaced without inventive efforts. Such modifications or replacements will be readily apparent to those skilled in the art, and do not depart from the spirit or scope of the invention.

What is claimed is:

1. An imaging cartridge chip, comprising:
   a communication module for providing data communication between the imaging cartridge chip and an imaging device;
   a non-volatile data storage module for storing at least two different serial numbers;
   a volatile temporary data storage module connecting between the communication module and the non-volatile data storage module, and including at least two temporary data storage units; and
   a control module configured to:
      based on a preset condition, load different serial numbers into corresponding temporary data storage units;
      when the imaging device requests to read serial number information from the imaging cartridge chip, send a serial number in a selected temporary data storage unit to the imaging device via the communication module;
      determine whether the serial number sent to the imaging device passes a legitimacy verification of the imaging device; and
      when the serial number sent to the imaging device does not pass the legitimacy verification of the imaging device, send a serial number in another temporary data storage unit to the imaging device.

2. The imaging cartridge chip according to claim 1, wherein:
   the non-volatile data storage module includes at least two non-volatile data storage areas, and the at least two different serial numbers are respectively stored in the at least two non-volatile data storage areas.

3. The imaging cartridge chip according to claim 2, wherein:
   the volatile temporary data storage module includes a first temporary data storage unit and a second temporary data storage unit;
   based on the preset condition, the control module is configured to:
      load two different serial numbers into the first temporary data storage unit and the second temporary data storage unit, respectively;
      when the imaging device requests to read serial number information from the imaging cartridge chip, send the serial number in the first temporary data storage unit to the imaging device via the communication module;
      determine whether the serial number sent to the imaging device passes the legitimacy verification of the imaging device; and
      when the serial number sent to the imaging device does not pass the legitimacy verification of the imaging device, send the serial number in the second temporary data storage unit to the imaging device.

4. The imaging cartridge chip as claimed in claim 3, wherein:
   after sending the serial number in the second temporary data storage unit to the imaging device, the control module is further configured to:
      determine whether the serial number sent to the imaging device passes the legitimacy verification of the imaging device; and
      when the serial number sent to the imaging device does not pass the legitimacy verification of the imaging device, load two different serial numbers into the first temporary data storage unit and the second temporary data storage unit, respectively, and send the serial number in the first temporary data storage unit to the imaging device.

5. The imaging cartridge chip as claimed in claim 3, wherein the control module is further configured to:
   when the control module sends the serial number in the second temporary data storage unit to the imaging device, load a new serial number into the first temporary data storage unit;
   determine whether the serial number sent to the imaging device passes the legitimacy verification of the imaging device; and
   when the serial number in the second temporary data storage unit does not pass the legitimacy verification of the imaging device, send the serial number in the first temporary data storage unit to the imaging device, and load another new serial number into the second temporary data storage unit.

6. The imaging cartridge chip according to claim 1, wherein the preset condition includes one or more of:
   the imaging cartridge chip being powered-on and initialized by the imaging device;
   detecting that the imaging device stopped powering the imaging cartridge chip;
   receiving a reset signal from the imaging device;
   receiving read instructions retransmitted by the imaging device;
   detecting that a clock signal transmitted by the imaging device runs slower or faster; and detecting that the imaging device continues to power the imaging cartridge chip but signals on a data bus or on a clock line remain unchanged.

7. An imaging cartridge, comprising:
an imaging cartridge chip containing:
a communication module for providing data communication between the imaging cartridge chip and an imaging device;
a non-volatile data storage module for storing at least two different serial numbers;
a volatile temporary data storage module connecting between the communication module and the non-volatile data storage module, and including at least two temporary data storage units; and
a control module configured to:
based on a preset condition, load different serial numbers into corresponding temporary data storage units;
when the imaging device requests to read serial number information from the imaging cartridge chip, send a serial number in a selected temporary data storage unit to the imaging device via the communication module;
determine whether the serial number sent to the imaging device passes a legitimacy verification of the imaging device; and
when the serial number sent to the imaging device does not pass the legitimacy verification of the imaging device, send a serial number in another temporary data storage unit to the imaging device.

8. The imaging cartridge according to claim 7, wherein:
the non-volatile data storage module includes at least two non-volatile data storage areas, and
the at least two different serial numbers are respectively stored in the at least two non-volatile data storage areas.

9. The imaging cartridge according to claim 8, wherein:
the volatile temporary data storage module includes a first temporary data storage unit and a second temporary data storage unit;
based on the preset condition, the control module is configured to:
load two different serial numbers into the first temporary data storage unit and the second temporary data storage unit, respectively;
when the imaging device requests to read serial number information from the imaging cartridge chip, send the serial number in the first temporary data storage unit to the imaging device via the communication module;
determine whether the serial number sent to the imaging device passes the legitimacy verification of the imaging device; and
when the serial number sent to the imaging device does not pass the legitimacy verification of the imaging device, send the serial number in the second temporary data storage unit to the imaging device.

10. The imaging cartridge according to claim 9, wherein:
after sending the serial number in the second temporary data storage unit to the imaging device, the control module is further configured to:
determine whether the serial number sent to the imaging device passes the legitimacy verification of the imaging device; and
when the serial number sent to the imaging device does not pass the legitimacy verification of the imaging device, load two different serial numbers into the first temporary data storage unit and the second temporary data storage unit, respectively, and send the serial number in the first temporary data storage unit to the imaging device.

11. The imaging cartridge according to claim 9, wherein the control module is further configured to:
when the control module sends the serial number in the second temporary data storage unit to the imaging device, load a new serial number into the first temporary data storage unit;
determine whether the serial number sent to the imaging device passes the legitimacy verification of the imaging device; and
when the serial number in the second temporary data storage unit does not pass the legitimacy verification of the imaging device, send the serial number in the first temporary data storage unit to the imaging device, and load another new serial number into the second temporary data storage unit.

12. The imaging cartridge according to claim 7, wherein the preset condition includes one or more of:
the imaging cartridge chip being powered-on and initialized by the imaging device;
detecting that the imaging device stopped powering the imaging cartridge chip;
receiving a reset signal from the imaging device;
receiving read instructions retransmitted by the imaging device;
detecting that a clock signal transmitted by the imaging device runs slower or faster; and
detecting that the imaging device continues to power the imaging cartridge chip but signals on a data bus or on a clock line remain unchanged.

13. A serial number switching method of an imaging cartridge chip having a non-volatile data storage module for storing at least two different serial numbers and a volatile temporary data storage module containing at least two temporary data storage units, comprising:
(a) reading two different serial numbers from the data storage module and loading the two different serial numbers into a first temporary data storage unit and a second temporary data storage unit, respectively;
(b) sending the serial number in the first temporary data storage unit to an imaging device;
(c) determining whether the serial number sent to the imaging device passes a legitimacy verification of the imaging device; and
(d) when the serial number sent to the imaging device does not pass the legitimacy verification of the imaging device, send the serial number in the second temporary data storage unit to the imaging device.

14. The method according to claim 13, wherein:
step (d) further includes: loading a new serial number into the first temporary data storage unit; and
after step (d), the method further comprises:
(e) determining whether the serial number in the second temporary data storage unit passes the legitimacy verification of the imaging device; and
(f) when the serial number in the second temporary data storage unit does not pass the legitimacy verification of the imaging device, sending the serial number in the first temporary data storage unit to the imaging device; loading another new serial number into the second temporary data storage unit; and returning to step (c).

15. The method of claim 13, after step (d), the method further comprising:

(g) determining whether the serial number sent to the imaging device passes the legitimacy verification of the imaging device; and
(h) when the serial number sent to the imaging device does not pass the legitimacy verification of the imaging device, reading two different new serial numbers from the data storage module; loading the two different new serial numbers into the first temporary data storage unit and the second temporary data storage unit, respectively; and returning to step (b).

* * * * *